(12) United States Patent
Blanchard

(10) Patent No.: US 7,566,984 B2
(45) Date of Patent: Jul. 28, 2009

(54) VEHICLE CABIN POWER TRANSFER ARRANGEMENT

(75) Inventor: Robert R. Blanchard, Fenton, MI (US)

(73) Assignee: Nissan Technical Center North America, Inc., MI (US)

( * ) Notice: Subject to any disclaimer, the term of this patent is extended or adjusted under 35 U.S.C. 154(b) by 609 days.

(21) Appl. No.: 11/224,089

(22) Filed: Sep. 13, 2005

(65) Prior Publication Data

US 2007/0075153 A1 Apr. 5, 2007

(51) Int. Cl.
*B60L 1/00* (2006.01)
(52) U.S. Cl. ........................ 307/9.1
(58) Field of Classification Search ................. 307/9.1
See application file for complete search history.

(56) References Cited

U.S. PATENT DOCUMENTS

| | | | |
|---|---|---|---|
| 6,075,229 A * | 6/2000 | Vanselow | 219/432 |
| 6,670,583 B2 | 12/2003 | Kara | |
| 6,906,495 B2 | 6/2005 | Cheng et al. | |
| 6,960,968 B2 * | 11/2005 | Odendaal et al. | 333/219 |
| 2004/0145343 A1 | 7/2004 | Naskali et al. | |
| 2006/0043927 A1 * | 3/2006 | Beart et al. | 320/108 |
| 2007/0072474 A1 * | 3/2007 | Beasley et al. | 439/332 |

\* cited by examiner

*Primary Examiner*—Robert L. DeBeradinis
(74) *Attorney, Agent, or Firm*—Global IP Counselors

(57) ABSTRACT

A vehicle cabin power transfer arrangement that includes a vehicle cabin structure, a primary inductor power transfer unit and a vehicle power source is provided. The vehicle cabin structure has an exposed surface accessible from a vehicle cabin. The primary inductor power transfer unit is disposed in the vehicle cabin structure such that induction current produced by the primary inductor power transfer unit emits through the exposed power transfer surface to create an induction field above exposed surface. The vehicle power source is electrically coupled to the primary inductor power transfer unit.

20 Claims, 7 Drawing Sheets

VEHICLE CABIN POWER TRANSFER ARRANGEMENT

BACKGROUND OF THE INVENTION

1. Field of the Invention

The present invention generally relates to a vehicle cabin power transfer arrangement. More specifically, the present invention relates to transferring power within a vehicle cabin without direct electrical conduction of contacts.

2. Background Information

Nowadays, vehicles are often used to operate a variety of portable electrical devices such as heated cups, cell phones, laptop computers, etc. To accommodate theses electrical devices, adapters have been developed that can be plugged into one of a plurality of cigarette lighter sockets, which then acts as a vehicle power outlet for providing electrical power to the electrical device. Many of today's electrical devices incorporate a rechargeable battery or rechargeable power cell. These vehicle power outlets are often used for recharging such electrical devices. However, some of these electrical devices are configured to be recharged via inductive coupling. Thus, these electrical devices that use inductive coupling can not be recharged in a vehicle without some sort of special adapter. Examples of some electrical devices that use inductive coupling include portable telephones, electrical shavers and electrical tooth brushes.

In particular, U.S. Patent Application No. 2004/0145343 discloses a contactless charging system based on induction coupling. The contactless charging system includes a primary coil in a charger and a secondary coil in a portable telephone. The charger charges a battery in the portable telephone via induction coupling between the primary and secondary coils.

However, with the above mentioned electrical devices, one disadvantage is the primary coil and secondary coil must be accurately aligned. Attempts to diminish the requirement of exact alignment between the coils have been made, for example, in contactless power transfer systems such as disclosed in U.S. Pat. No. 6,906,495. The contactless power transfer system of this patent provides a thin plate like member having a primary inductor with a coil. When a current flows through the thin plate like member, an electromagnetic field or flux is generated above an exterior surface. A secondary device placed on the exterior surface in any orientation receives power from the primary unit via a second inductor. The second inductor, which is placed within the magnetic flux, provides a voltage to the secondary device.

Instead of using one of the cigarette lighter sockets as a power outlet, it is also known to hardwire an adapter directly to the electrical system of the vehicle. For example, U.S. Pat. No. 6,670,583 to Kara (Assigned to Ford Global Technologies, LLC) discloses providing a heatable cup system in which a cup holder that is attached to a console of a vehicle receives a heatable cup. The cup and cup holder have corresponding electric contacts with the electric contacts of the cup holder being hard wired to the electrical system of the vehicle. The electric contacts are in the form of magnets to produce a contact assisted by magnetic force.

However, the heated cup system has electric contacts that are exposed to a wet environment. That is, if liquid in the cup should spill, the charger could become shorted out. Furthermore, the electric contacts in the above heated cup system must be accurately aligned.

In view of the above, it will be apparent to those skilled in the art from this disclosure that there exists a need for an improved vehicle cabin power transfer arrangement that limits exposure of electrical contacts to a wet environment. This invention addresses this need in the art as well as other needs, which will become apparent to those skilled in the art from this disclosure.

SUMMARY OF THE INVENTION

An object of the invention is to provide a vehicle cabin power transfer arrangement with electrical components that are not exposed to a wet environment.

Another object of the invention is to provide a vehicle cabin power transfer arrangement that does not require accurate alignment of electric contacts.

These objects and other advantages are attained by providing a vehicle cabin power transfer arrangement that includes a vehicle cabin structure, a primary inductor power transfer unit and a vehicle power source. The vehicle cabin structure has an exposed surface accessible from a vehicle cabin. The primary inductor power transfer unit is disposed in the vehicle cabin structure such that induction current produced by the primary inductor power transfer unit emits through the exposed power transfer surface to create an induction field above exposed surface. The vehicle power source is electrically coupled to the primary inductor power transfer unit.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
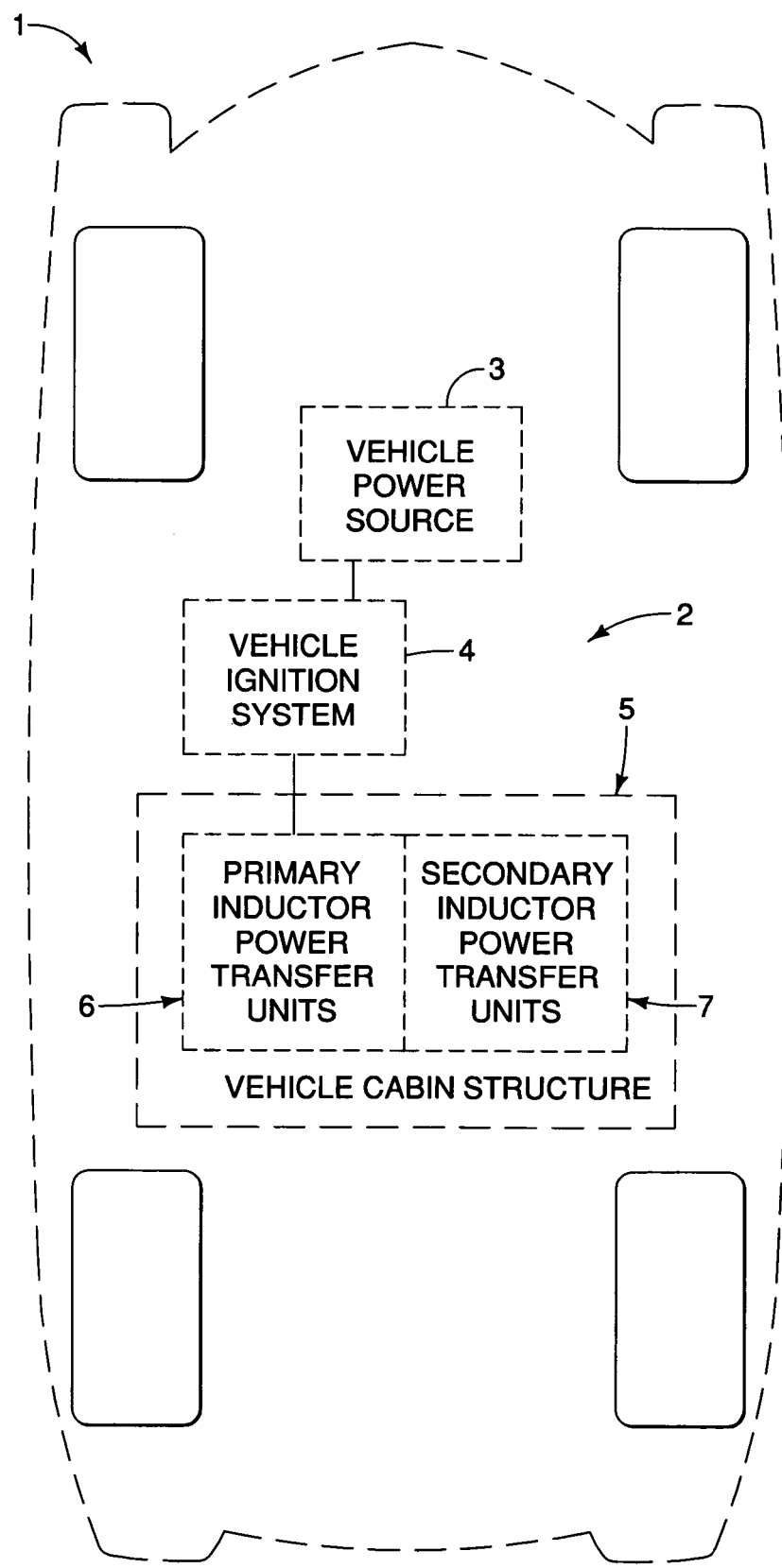
FIG. 1 is a simplified schematic view of a vehicle with a vehicle cabin power transfer arrangement with a primary inductor power transfer unit built into vehicle cabin structure and a secondary inductor power transfer unit that is part of a portable accessory (e.g., a heatable cup, cell phone, PDA, laptop computer, razor, etc.) in accordance with a preferred embodiment of the present invention.

Referring initially to FIG. 1, a vehicle 1 with a vehicle cabin power transfer arrangement 2 is illustrated in accordance with a first embodiment of the present invention. The vehicle 1 generally has conventional components that are well known in the art. Since the vehicle components, with the exception of the vehicle cabin power transfer arrangement 2, are well known in the art, these structures will not be discussed or illustrated in detail herein. Rather, it will be apparent to those skilled in the art from this disclosure that the vehicle components can be any type of structure that can be used to carry out the present invention.

Figure 2:
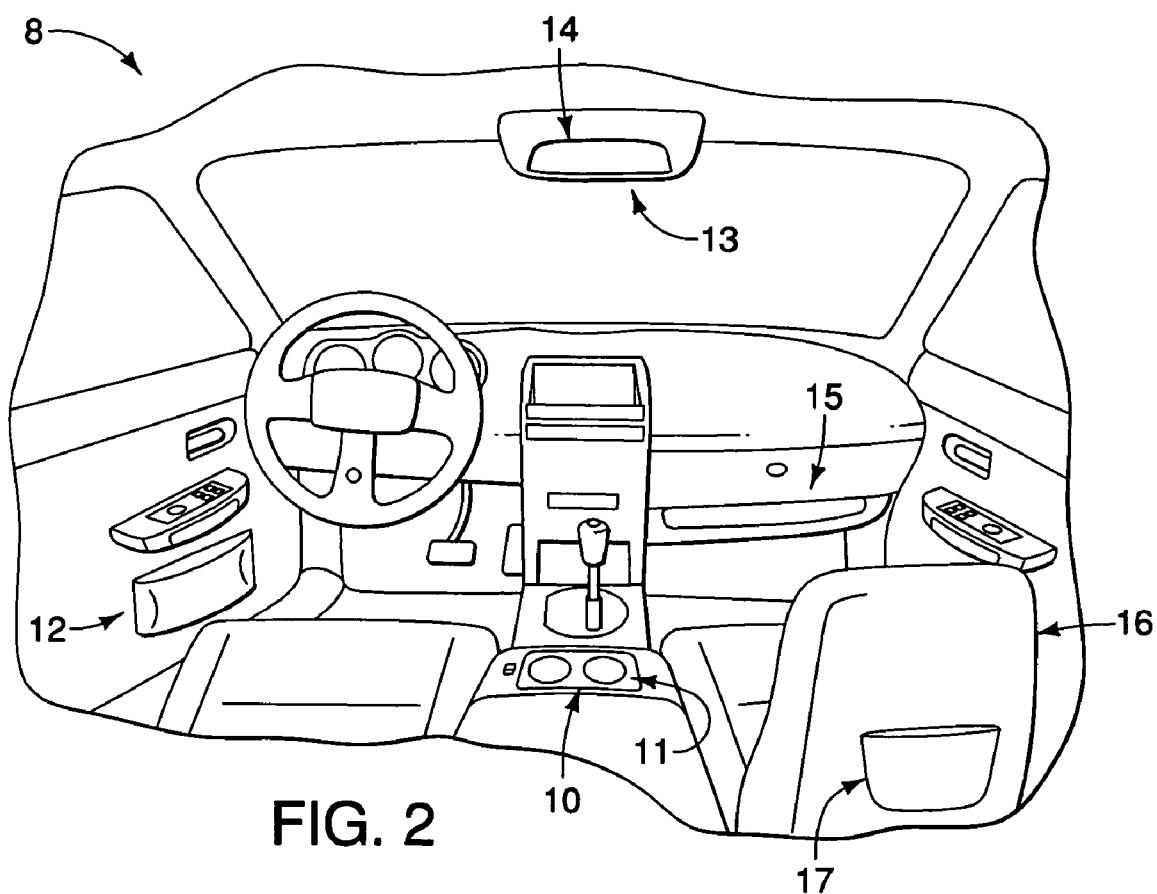
FIG. 2 is a partial perspective view of a vehicle cabin structure in which the primary inductor power transfer unit of the vehicle cabin power transfer arrangement has been implemented in several different storage areas of the vehicle cabin structure in accordance with the present invention.
Figure 3:
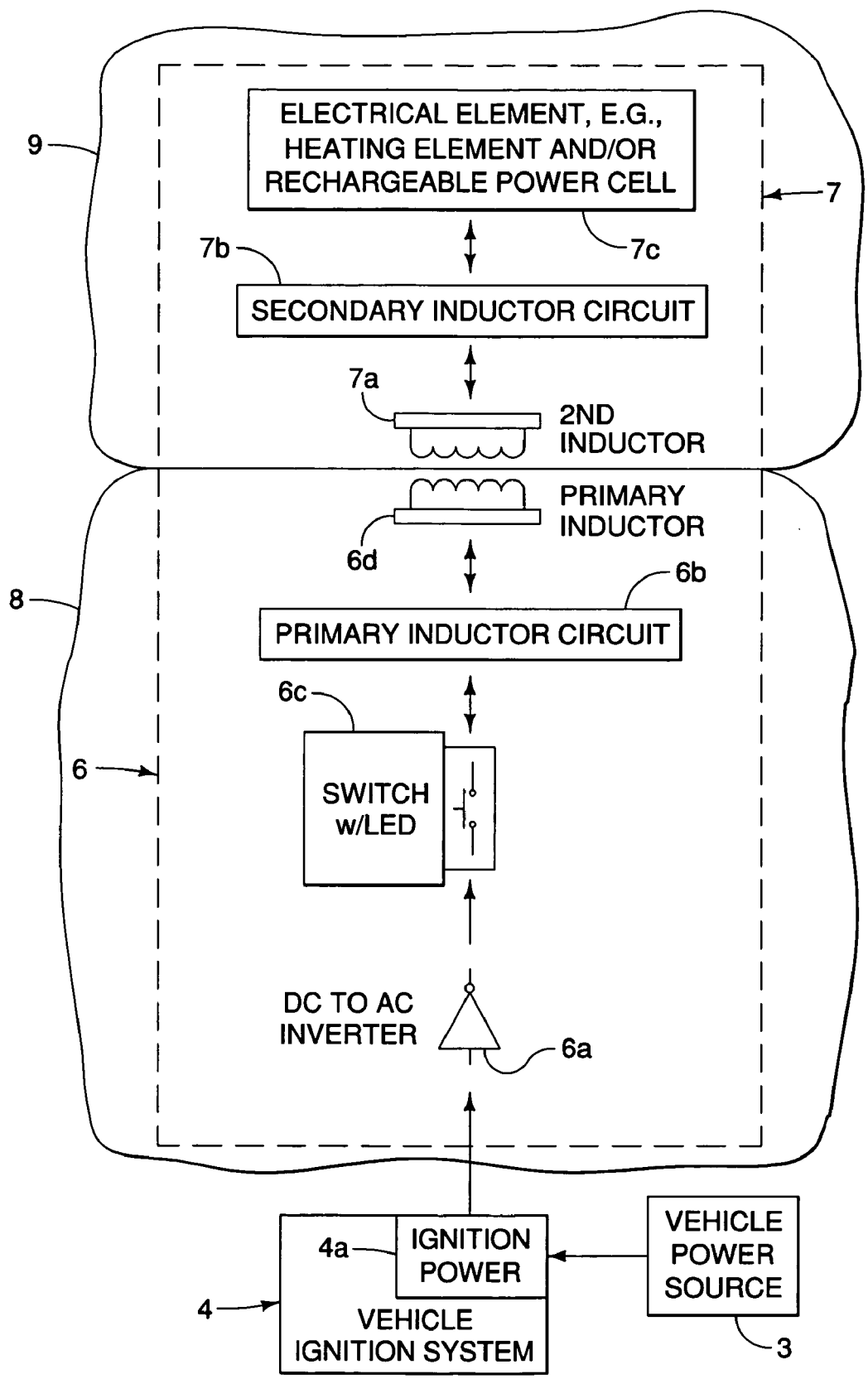
FIG. 3 is a schematic view of one of the storage areas of the vehicle cabin structure with the built in primary inductor power transfer unit and the portable accessory with the secondary inductor power transfer unit in accordance with the present invention.

Referring to FIGS. 1-3, the vehicle cabin power transfer arrangement 2 basically includes a vehicle power source 3, a vehicle ignition system 4 and a vehicle cabin 5 having one or more primary inductor power transfer units 6 and one or more secondary inductor power transfer units 7. The primary inductor power transfer units 6 are built into a portion of a vehicle cabin structure 8 of the vehicle cabin 5 with the main components or structures of the primary inductor power transfer units 6 being the same for each unit, except that their dimensions and shapes are different to complement the area in the vehicle cabin 5 where they are installed. Thus, the primary inductor power transfer units 6 will first be discussed generically and then more specifically below. The secondary inductor power transfer units 7 are built into accessories 9 such as a heated cup, a cell phone, an adapter, a PDA, etc. These accessories 9 can be either sold as options with the vehicle or can be sold separately from the vehicle as after market add-ons. The main components or structures of secondary inductor power transfer units 7 are the same for each unit, except that their dimensions and shapes are different to complement the particular accessory in which they are installed. Thus, the main components or structures of the secondary inductor power transfer units 7 will first be discussed generically and then more specifically below.

The vehicle power source 3 is preferably a vehicle battery that is electrically coupled to the vehicle ignition system 4 such that operation of the vehicle ignition system 4 provides electrical power to the primary inductor power transfer units 6. The secondary inductor power transfer units 7 in turn receive electrical power from the primary inductor power transfer unit 6 as explained below. The primary inductor power transfer units 6 are built into one or more storage areas of the vehicle cabin structure 8, as shown in FIG. 2, for supplying electrical power to the secondary inductor power transfer unit 7, which is built into the accessories 9. Accordingly, the vehicle power source 3 supplies electrical power to the primary inductor power transfer units 6 which in turn supplies electrical power to the secondary inductor power transfer units 7 when the vehicle 1 is turned on via the vehicle ignition system 4. The transfer of electrical power from one of the primary inductor power transfer units 6 to one or more of the secondary inductor power transfer units 7 can be done automatically once the vehicle 1 is turned on or can require a person to manually activate the primary inductor power transfer units 6 to start the power transfer process.

Referring to FIG. 2, the vehicle cabin structure 8 includes, among other things, various vehicle cabin portions such as a center console 10 with a cup holder 11, a vehicle door bin 12, an overhead vehicle console 13 with a storage compartment 14, a vehicle glove box 15, and a vehicle seat 16 with a storage compartment 17. Each of the vehicle cabin portions 11, 12, 14, 13 and 17 are storage areas that are configured and arranged with one of the primary inductor power transfer units 6 built therein such that one or more of the accessories 9 will receive electrical power when one or more of the accessories 9 are placed in one of these vehicle cabin portions 11, 12, 14, 13 and 17 as explained below. Since the application of the primary inductor power transfer unit 6 to each of these vehicle cabin portions 11, 12, 14, 13 and 17 is essentially the same, but for dimensions and shapes, the generic description of the primary inductor power transfer unit 6 applies to each of these vehicle cabin portions 11, 12, 14, 13 and 17.

Referring to FIG. 3, the vehicle ignition system 4 has an ignition power source switch 4a that is preferably operated by a vehicle ignition key in a convention manner to start the vehicle 1. The ignition power source switch 4a is configured and arranged to selectively supply and disconnect electrical power from the vehicle power source 3 to the primary inductor power transfer unit 6. Thus, power for the primary inductor power transfer unit 6 is selectively supplied to the secondary inductor power transfer unit 7 when the vehicle 1 is started and selectively discontinued when the vehicle 1 is turned off as explained below.

Referring to FIG. 3, each of the primary inductor power transfer units 6 basically includes a DC/AC inverter 6a, a primary inductor circuit 6b, a manually operable switch 6c and a primary inductor 6d. The DC/AC inverter 6a is electrically coupled to the vehicle ignition system 4 to convert DC power from the vehicle power source 3 into AC power when electrical power is being provided to the primary inductor power transfer unit 6. The switch 6c is configured and arranged between the DC/AC inverter 6a and the primary inductor circuit 6b to selectively connect and disconnect electrical power from the DC/AC inverter 6a to the primary inductor circuit 6b. The primary inductor circuit 6b is electrically coupled to the primary inductor 6d. Thus, the switch 6c is operatively arranged to selectively supply electrical power from the vehicle power source 3 through the primary inductor charging circuit 6 to the secondary inductor power transfer unit 7 when the vehicle 1 is turned on via the vehicle ignition system 4 and the switch 6c has been operated to an "ON" position. A conventional switch logic circuit is built into the primary inductor circuit 6b.

As mentioned above, the primary inductor power transfer unit 6 is built into one or more portions of the vehicle cabin structure 8, as explained below, so that an induction current is produced by the primary inductor power transfer unit 6. Specifically, the primary inductor 6d includes a wire coil that generates lines of flux when an AC current flows through the coil of the primary inductor 6d. This induction current of the primary inductor power transfer unit 6 is emitted through an exposed power transfer surface of the vehicle cabin structure 8 to create an induction field above the exposed power transfer surface. Thus, when the secondary inductor power transfer unit 7, which is built into the accessory 9, is placed within the induction field of the primary inductor power transfer unit 6, the electrical power is transferred from the primary inductor power transfer unit 6 to the secondary inductor power transfer unit 7 in a contactless manner, i.e., without physical contact between electrical contacts of the primary inductor power transfer unit 6 and the secondary inductor power transfer unit 7. The coil of the primary inductor 6d is preferably wound or printed such that the induction field is generated to penetrate through the exposed power transfer surface of the vehicle cabin structure 8 with a portion of the induction field located above the exposed power transfer surface. The induction field is generated substantially in the same way or identically as disclosed in U.S. Pat. No. 6,906,495. Since the structure to create the induction field is known in the art, this structure will not be discussed or illustrated in detail herein.

Still referring to FIG. 3, each of the secondary inductor power transfer units 7 basically includes a second inductor 7a, a secondary inductor circuit 7b and an electrical element 7c such as a rechargeable power cell or a heating element. As mentioned above, the secondary inductor power transfer unit 7 is part of the accessory 9 that is configured to be operated by the induction field produced by the primary inductor power transfer unit 6. Basically, the secondary inductor 7a is electrically coupled to the secondary inductor circuit 7b, while the secondary inductor circuit 7b is electrically coupled to the electrical element 7c (rechargeable power cell or heating element). The secondary inductor 7a is configured and arranged within the accessory 9 to receive electrical power from the primary inductor 6a through inductive coupling. Specifically, the second inductor 7a includes a wire coil that interacts with the lines of flux when an AC current flows through the coil of the primary inductor 6d. In other words, the coils of the primary and secondary inductors 6d and 7a are designed to operate such that magnetic flux lines are coupled from one coil to the other. Each coil is operated in conjunction with a magnet in a conventional manner. In operation, an AC current flows into the coil of the primary inductor 6d and generates lines of flux. The flux couples to the secondary inductor 7a to induce voltage across the coil of the secondary inductor 7a. Accordingly, the primary inductor 6d inductively transmits electrical power to the secondary inductor 7a to generate inductive power for the electrical element 7c (rechargeable power cell or heating element). Since this type of contactless transfer of electrical power is generally well known, the operation and configuration of the primary and secondary inductor power transfer units 6 and 7 will not be described or illustrated herein in more detail. Furthermore, the coils of the primary and secondary inductors 6d and 7a are diagrammatically shown in the Figures and can actually be in a variety of forms, such as the coils in U.S. Pat. No. 6,906,495 to Cheng et al.

In any event, the induction field generated by the primary inductor 6d should be such that the secondary inductor power transfer unit 7 need not be accurately aligned with the primary inductor power transfer unit 6. Rather, the secondary inductor power transfer unit 7 need only be placed on the exposed power transfer surface, which has the induction field thereabove as discussed below. Accordingly, the induction field is generated such that the secondary power transfer unit 7 is able to receive power regardless of its orientation or location with respect to the primary power transfer unit 6.

Center Console

Figure 4:
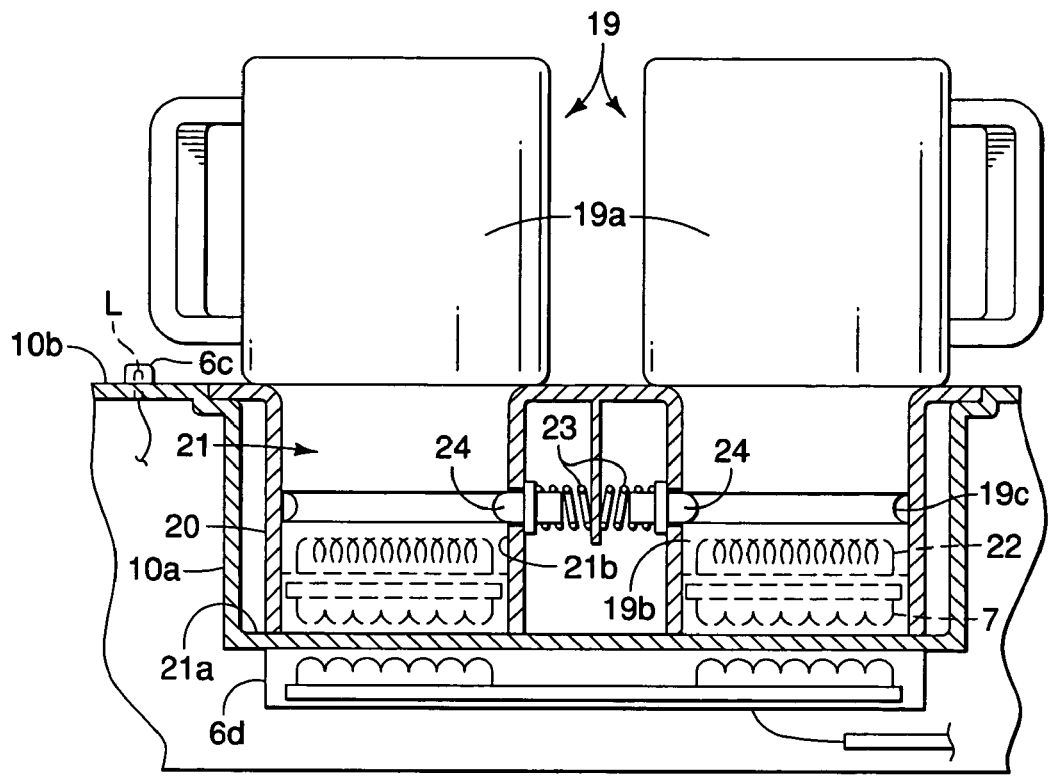
FIG. 4 is a simplified, partial cross sectional view of one of the storage areas of the vehicle cabin structure in the form of a center console having the primary inductor power transfer unit illustrated in FIGS. 1 and 3, and a pair of accessories in the form of heatable cups having the secondary inductor power transfer unit illustrated in FIGS. 1 and 3.
Figure 5:
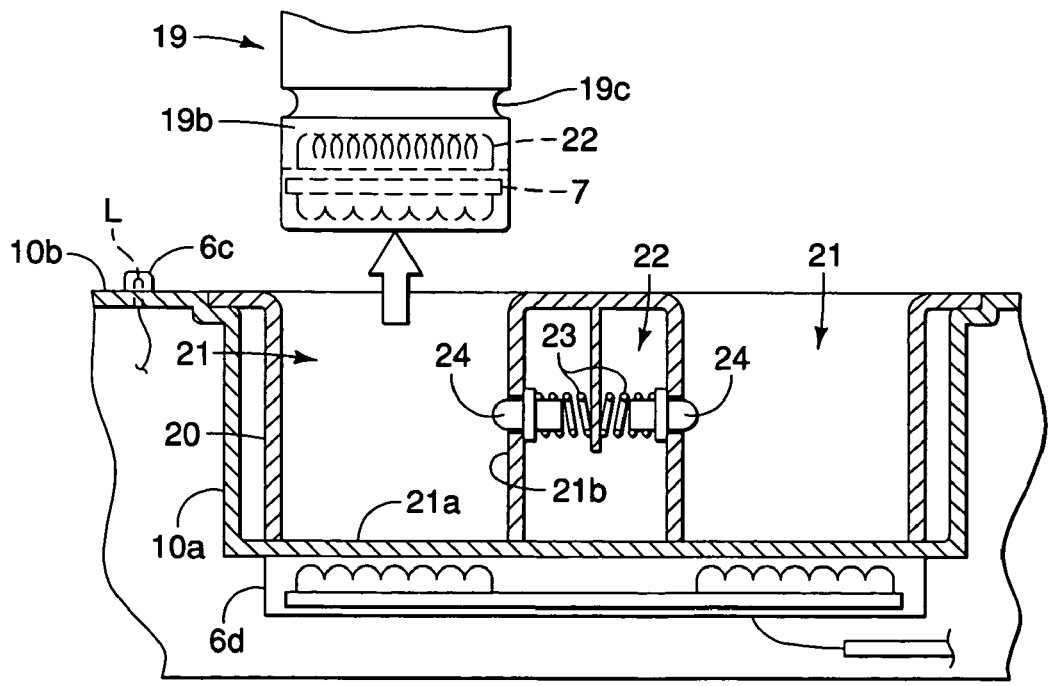
FIG. 5 is a simplified, partial cross sectional view of the center console, similar to FIG. 4 with one the heatable cups being shown prior to insertion into one of the cup receiving recesses of the center console in accordance with the present invention.

Referring now to FIGS. 4 and 5, one application of the present invention will now be discussed in more detail. In this illustrated example, the primary inductor power transfer unit 6 is implemented as part of the center console 10 of the vehicle cabin structure 8 and the secondary inductor power transfer unit 7 is implemented as part of a heatable cup 19, which corresponds to the generic accessory 9, mentioned above. In this application of the present invention, the center console 10 has a cup insert member 20 that is selectively installed in a storage compartment 10a of the center console 10. The cup insert member 20 includes a pair of cup receiving recesses 21. The receiving recesses 21 form a pair of cup holders that selectively receive the heatable cup 19.

Referring to FIG. 5, the heatable cup 19 basically includes an upper cup portion 19a and a lower mating portion 19b with the secondary power transfer unit 7 embedded within the lower mating portion 19b. The lower mating portion 19b also has the electrical element 7c (heating element) embedded therein, with the electrical element 7c (heating element) being electrically coupled to the secondary power transfer unit 7. The lower mating portion 19b has an outer peripheral surface with an annular indentation 19c that acts as a lock portion. The lower mating portion 19b is configured to be releasably coupled to one of the receiving recesses 21 of the vehicle cabin structure 8.

Each of the cup receiving recesses 21 has a bottom wall 21a formed by the storage compartment 10a of the center console 10 and a peripheral side wall 21b that mates with the lower mating portion 19b of the heatable cup 19. The bottom wall 21a has an upper surface that contacts or is closely adjacent to a bottom surface of the lower mating portion 19b of the heatable cup 19. This upper surface of the bottom wall 21a forms an exposed power transfer surface that is accessible from the vehicle cabin 5. The exposed power transfer surface is readily accessible to a passenger in the vehicle 1 without disassembling interior parts. The readily accessible exposed power transfer surface preferably includes merely opening a compartment in the vehicle 1. The bottom wall 21a is located directly above the primary inductor power transfer unit 6, which is disposed in the center console 10 of the vehicle cabin structure 8. In other words, the primary inductor power transfer unit 6 is disposed in the center console 10 of the vehicle cabin structure 8 such that induction current produced by the primary inductor power transfer unit 6 emits through the exposed power transfer surface formed by the bottom wall 21a of the center console 10 to create an induction field above the exposed power transfer surface.

At least a portion of each of the cup receiving recesses 21 has an inner peripheral surface of the peripheral side wall 21b being configured and arranged to form a mating base portion for snuggly receiving the lower mating portion 19b of the heatable cup 19. Optionally, the cup insert member 20 has a lock structure 22 for each of the receiving recesses 21 to fixedly secure the heatable cup 19 as needed and/or desired.

For example, each of the lock structures 22 includes a spring or biasing element 23 and a movable latch element 24. The movable latch element 24 is normally biased so that a tip portion of the movable latch element 24 extends into the receiving recesses 21. The tip portion of the movable latch element 24 selectively engages the annular indentation 19c of the heatable cup 19 to releasably secure the heatable cup 19 within one of the cup receiving recesses 21. The lock structure 22 constitutes a movement prevention mechanism in that it prevents perpendicular movement of the secondary inductor power transfer unit 7 of the accessory 9 with respect to the power transfer surface. As a result, the secondary inductor power transfer unit 7 remains within the induction field of the exposed power transfer surface. It will be apparent to one of skill in the art from this disclosure that the lower mating portion 19b of the heatable cup 19 can be placed in the cup receiving recesses 21 without the use of the lock structure 22.

In this application of the present invention, the switch 6c is located on an outer surface of a bezel portion 10b of the center console 10 for selectively connecting and disconnecting the supply of electrical power to the primary inductor circuit 6b when the ignition power source switch 4a has been turned on. The switch 6c preferably has an indicating element L that includes for example, an LED. The switch 6c is a push button type switch that is selectively pushed to turn the inductive power transfer on or off. The indicating element L emits light when induction power transferring occurs and ceases to emit light when induction power transferring is complete or the vehicle ignition system 4 is turned off. The indicating element L indicates whether the vehicle power source 3 is electrically coupled to the rechargeable power cell 7c. Accordingly, the switch logic circuit in the primary inductor circuit 6b controls the indicating element L according to whether induction charging occurs or whether the vehicle ignition system 4 is on or off.

While the storage compartment 10a of the center console 10 is especially designed to receive the cup insert member 20 to form the cup receiving recesses 21, it will be apparent to those skilled from this disclosure that the storage compartment 10a can be used to transfer power to other electrical devices when the cup insert member 20 is removed. Thus, the storage compartment 10a is equipped to hold various items such as a cup, cell phone or pocket change. Moreover, various types of adapters can be made to correctly position an accessory that is constructed in accordance with the generic accessory 9 that is discussed above. For example, a foam insert can be used to correctly position the accessory with the storage compartment 10a so that the secondary inductor power transfer unit 7 is positioned closely adjacent the bottom wall 21a that is located directly above the primary inductor power transfer unit 6.

In any event, the electrical element 7c (a heating element in the case of the heatable cup 19) receives electrical power via inductive coupling. Specifically, in operation, the lower mating portion 19b of the heatable cup 19 is received within one of the receiving recesses 21 of the vehicle cabin structure 8 so that the second inductor 7a is physically located within the flux generated by the primary inductor 6d. Accordingly, the flux induces a voltage across the coil of the second inductor 7a. The voltage is then supplied via the secondary inductor circuit 7b to the electrical element 7c (a heating element in the case of the heatable cup 19). Alternatively, the electrical element 7c of the heatable cup 19 can include both a heating element and rechargeable power cell instead of just a heating element as shown so that the heating element is then powered by the rechargeable power cell so that heat from the heating element is then transferred to liquid in the heatable cup 19.

It will be apparent to one of skill in the art from this disclosure that the accessory 9 can be in the form of various electrical devices, such as a cell phone, MP3 player or PDA. Similar to the charging device disclosed in U.S. Patent Application Publication No. 2004/0145343, the secondary inductor power transfer unit 7 can be incorporated into a cell phone. Accordingly, the cell phone is placed in the storage compartment 10a such that the rechargeable battery or rechargeable power cell (the electrical element 7c) in the cell phone is charged via inductive coupling.

Alternate Accessory

Figure 6:
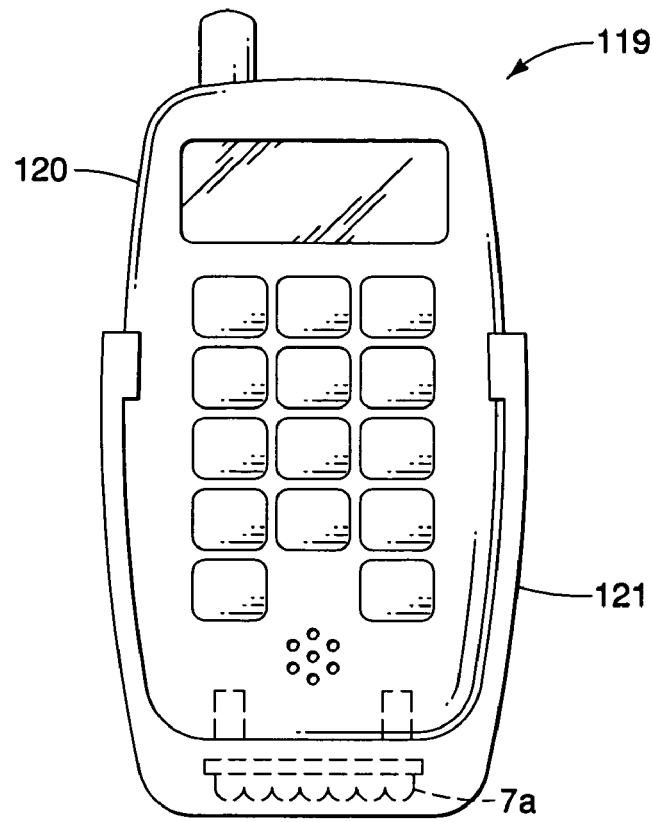
FIG. 6 is a front elevational view of a portable accessory with a secondary inductor power transfer unit in the form of a cell phone assembly (a cell phone plus an adapter) that constitutes part of the vehicle cabin power transfer arrangement in accordance with the present invention.
Figure 7:
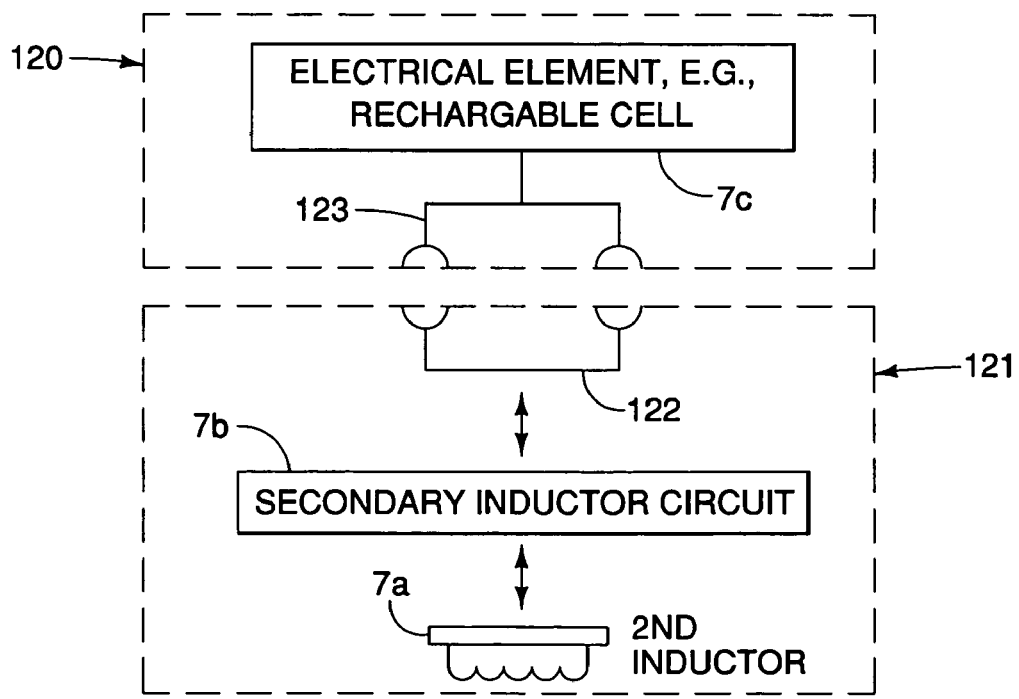
FIG. 7 is a schematic view of the cell phone assembly (portable accessory with the secondary inductor power transfer unit) in accordance with the present invention.

Referring now to FIGS. 6 and 7, one alternate configuration for the accessory 9 will now be explained. This alternate configuration of the accessory 9 is illustrated as a cell phone assembly 119. In view of the similarity between the power transfer structure of the heatable cup 19 and the power transfer structure of the cell phone assembly 119, the power transfer structures of the heatable cup 19 and the cell phone assembly 119 that are functionally identical will be given the same reference numerals that were used for the generically described accessory 9. Moreover, the descriptions of the parts of the power transfer structure of the cell phone assembly 119 that are functionally identical to the parts of the generically described accessory 9 may be omitted for the sake of brevity.

The cell phone assembly 119 basically includes a cell phone 120 and a cell phone adapter 121 that is coupled to the cell phone 120 in a releasable manner. The power transfer structure of the cell phone assembly 119 is substantially similar to the power transfer structure of the heatable cup 19, except that the electrical element 7c (rechargeable power cell) located in the cell phone 120 is separable from the second inductor 7a and the secondary inductor circuit 7b contained within the cell phone adapter 121. In other words, the secondary inductor power transfer unit 7 is split into two separate parts instead of being a single integrated unit as in the heatable cup 19. The cell phone adapter 121 is configured and arranged to support the cell phone 120. Preferably, the cell phone adapter 121 has a belt clasp (not shown) for securing the cell phone adapter 121 to a belt.

The cell phone adapter 121 has an electrical connector 122 that is configured to mate with an electrical connector 123 of the cell phone 120. The electrical connector 122 of the cell phone adapter 121 is electrically connected to the second inductor 7a and the secondary inductor circuit 7b of the secondary inductor power transfer unit 7. The electrical connector 123 of the cell phone 120 is electrically connected to the electrical element 7c (rechargeable power cell) of the secondary inductor power transfer unit 7. The secondary inductor power transfer unit 7 operates in the same manner as discussed above. Thus the second inductor 7a is configured to be inductively coupled to the primary inductor 6a when the cell phone assembly 119 is placed in the storage compartment 10. The electrical connector 123 of the cell phone 120 is configured to connect with a conventional cell phone recharger that is normally used to charge the cell phone 120 by being plugged into a conventional cigarette lighter. Accordingly, once the cell phone assembly 119 is placed into the storage compartment of the center console 10, the electrical element 7c (rechargeable battery) of the cell phone 120 is inductively coupled to the primary inductor power transfer unit 6 via the cell phone adapter 121. In this way, a standard cell phone is adapted to be charged though inductive coupling via the cell phone adapter 121, which forms one version of the accessory 9. More specifically, the flux from the primary inductor power transfer unit 6 induces a voltage at the secondary inductor 7a. The voltage is then supplied to the electrical element 7c (rechargeable battery) of the cell phone 120 via the secondary inductor circuit 7b.

Vehicle Door Bin

Figure 8:
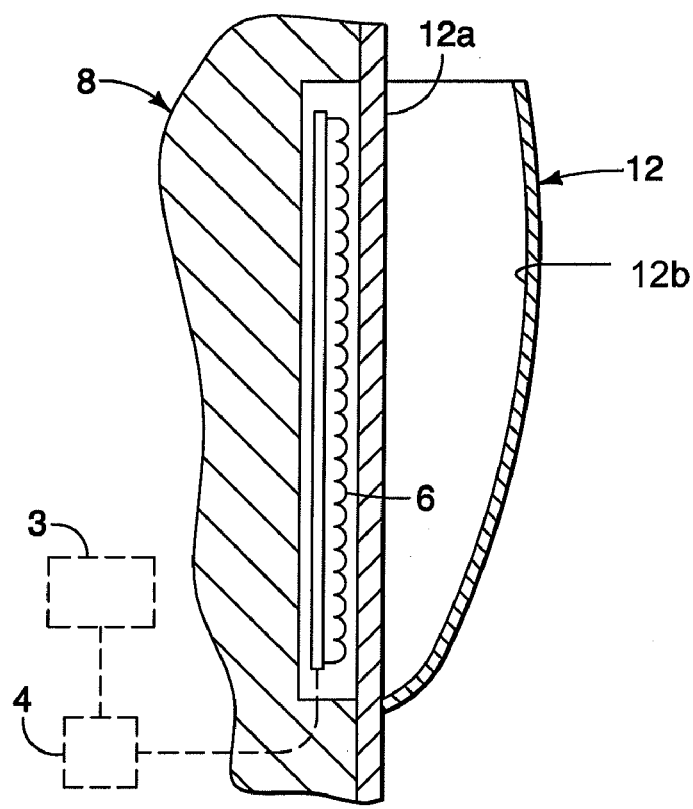
FIG. 8 is a simplified, partial view of one of the storage areas of the vehicle cabin structure in the form of a vehicle door bin having the primary inductor power transfer unit illustrated in FIGS. 1 and 3 in accordance with the present invention.

Referring now to FIG. 8, another application of the present invention will now be discussed in more detail. In this illustrated example, the primary inductor power transfer unit 6 is implemented as part of the vehicle door bin 12 of the vehicle cabin structure 8 (a part of a door in this application) and the secondary inductor power transfer unit 7 is implemented as part of an accessory such as the cell phone assembly 119, which corresponds to the generic accessory 9, mentioned above.

In this application of the present invention, the vehicle door bin 12 is constructed with a first wall 12a (e.g., interior door fascia) that is located directly adjacent the primary inductor power transfer unit 6, which is disposed in the vehicle door of the vehicle cabin structure 8 in a similar manner as in the center console 10. In other words, the primary inductor power transfer unit 6 is disposed in the vehicle door of the vehicle cabin structure 8 such that induction current produced by the primary inductor power transfer unit 6 emits through the exposed power transfer surface formed by the first wall 12a of the vehicle door bin 12 to create an induction field within the vehicle door bin 12. In this application, the primary inductor power transfer unit 6 is operated in the same manner as in the center console application discussed. Thus, the first wall 12a of the vehicle door bin 12 forms an exposed power transfer surface and the power transfer occurs upon starting the vehicle 1 and operating the switch 6c. The vehicle door bin 12 has a second wall 12b that is spaced apart from, and opposite, the first wall 12a to form an insertion aperture, as seen in FIG. 8. The first and second walls 12a and 12b have first and second compartment surfaces, respectively. The second compartment surface of the second wall 12b constitutes a movement prevention structure in that it prevents perpendicular movement of the secondary inductor power transfer unit 7 of the accessory 9 with respect to the exposed power transfer surface. As a result, the secondary inductor power transfer unit 7 remains within the induction field of the exposed power transfer surface.

In this application, various electrical devices such as cell phones, MP3 players or PDAs can be placed in the vehicle door bin 12 to charge the various electrical devices. For example, with the popularity of BLUETOOTH enabled wireless headsets for cell phones, a cell phone can be used while being charged in the vehicle cabin structure 8 through inductive couplings as described above.

Overhead Vehicle Console

Figure 9:
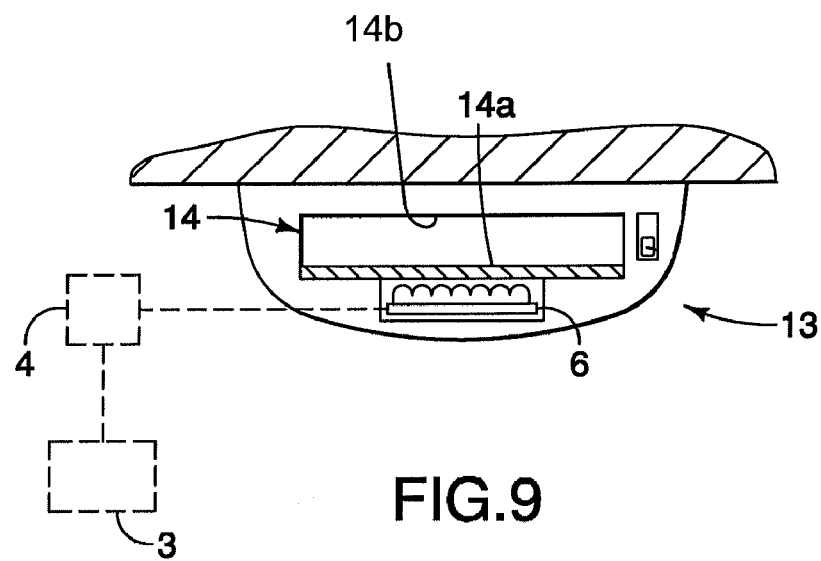
FIG. 9 is a side elevational view of one of the storage areas of the vehicle cabin structure in the form of an overhead vehicle console having the primary inductor power transfer unit illustrated in FIGS. 1 and 3 in accordance with the present invention.

Referring now to FIG. 9, another application of the present invention will now be discussed in more detail. In this illustrated example, the primary inductor power transfer unit 6 is implemented as part of the storage compartment 14 of the overhead vehicle console 13 of the vehicle cabin structure 8 and the secondary inductor power transfer unit 7 is implemented as part of an accessory such as the cell phone assembly 119, which corresponds to the generic accessory 9, mentioned above.

In this application of the present invention, the storage compartment 14 is constructed with a first wall 14a that is located directly adjacent the primary inductor power transfer unit 6, which is disposed in the overhead vehicle console 13 of the vehicle cabin structure 8 in a similar manner as in the center console 10. In other words, the primary inductor power transfer unit 6 is disposed in the overhead vehicle console 13 of the vehicle cabin structure 8 such that induction current produced by the primary inductor power transfer unit 6 emits through the exposed power transfer surface formed by the first wall 14a of the overhead vehicle console 13 to create an induction field in the storage compartment 14. In this application, the primary inductor power transfer unit 6 is operated in the same manner as in the center console and the vehicle door bin applications as described above. The storage compartment 14 has a second wall 14b that is spaced apart from, and opposite, the first wall 14a to form an insertion aperture, as seen in FIG. 9. The first and second walls 14a and 14b have first and second compartment surfaces, respectively. The second compartment surface of the second wall 14b constitutes a movement prevention structure in that it prevents perpendicular movement of the secondary inductor power transfer unit 7 of the accessory 9 with respect to the exposed power transfer surface. As a result, the secondary inductor power transfer unit 7 remains within the induction field of the exposed power transfer surface.

Vehicle Glove Box

Figure 10:
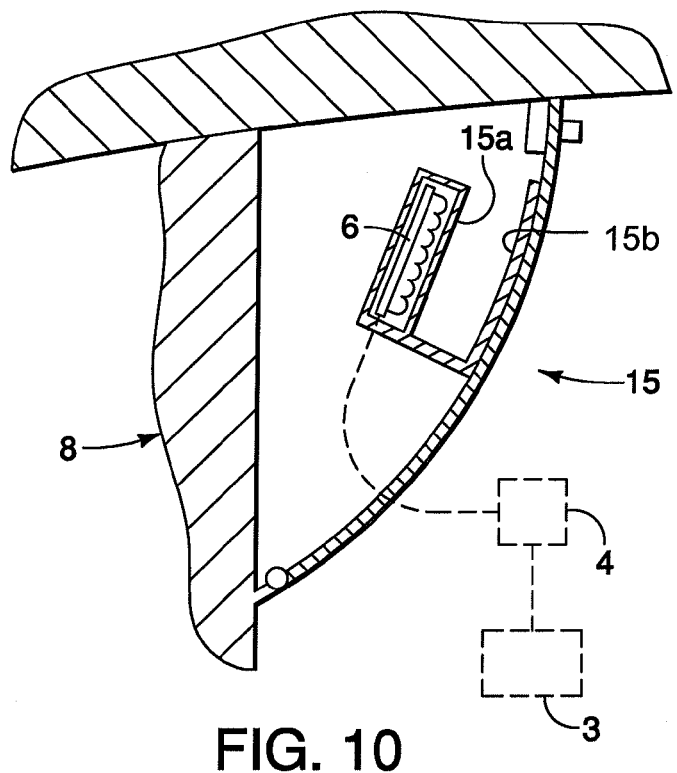
FIG. 10 is a simplified, partial cross sectional view of one of the storage areas of the vehicle cabin structure in the form of a vehicle glove box having the primary inductor power transfer unit in accordance with the present invention.

Referring now to FIG. 10, another application of the present invention will now be discussed in more detail. In this illustrated example, the primary inductor power transfer unit 6 is implemented as part of the vehicle glove box 15 of the vehicle cabin structure 8 and the secondary inductor power transfer unit 7 is implemented as part of an accessory such as the cell phone assembly 119, which corresponds to the generic accessory 9, mentioned above.

In this application of the present invention, the vehicle glove box 15 is constructed with an interior pocket having a first wall 15a that is located directly adjacent the primary inductor power transfer unit 6, which is built into the vehicle glove box 15 of the vehicle cabin structure 8 in a similar manner as in the center console 10. In other words, the primary inductor power transfer unit 6 is disposed in the vehicle glove box 15 of the vehicle cabin structure 8 such that induction current produced by the primary inductor power transfer unit 6 emits through the exposed power transfer surface formed by the first wall 15a of the vehicle glove box 15 to create an induction field in the vehicle glove box 15. In this application, the primary inductor power transfer unit 6 is operated in the same manner as in the center console, the vehicle door bin and the overhead vehicle console applications as described above. The vehicle glove box 15 has a second wall 15b that is spaced apart from, and opposite, the first wall 15a to form an insertion aperture, as seen in FIG. 10. The first and second walls 15a and 15b have first and second compartment surfaces, respectively. The second compartment surface of the second wall 15b constitutes a movement prevention structure in that it prevents perpendicular movement of the secondary inductor power transfer unit 7 of the accessory 9 with respect to the exposed power transfer surface. As a result, the secondary inductor power transfer unit 7 remains within the induction field of the exposed power transfer surface.

Vehicle Seat Storage Compartment

Figure 11:
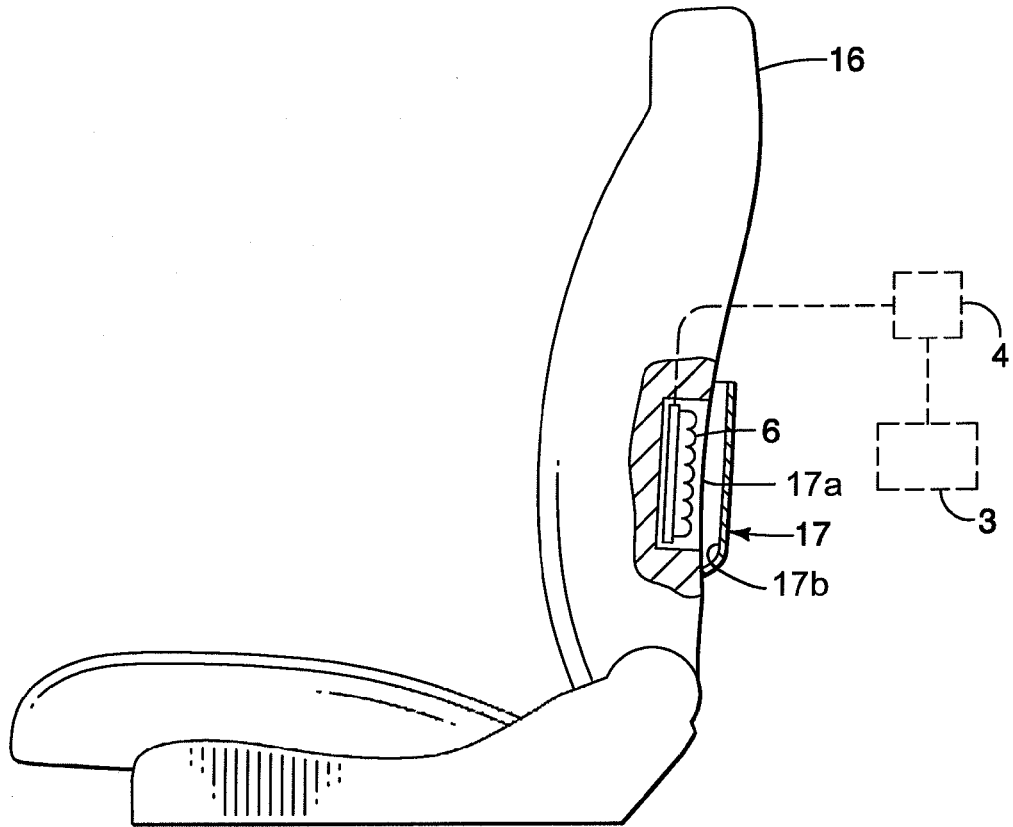
FIG. 11 is a simplified, partial cross sectional view of one of the storage areas of the vehicle cabin structure in the form of a seat pocket of a vehicle seat having the primary inductor power transfer unit of the vehicle cabin power transfer arrangement in accordance with the present invention.

Referring now to FIG. 11, another application of the present invention will now be discussed in more detail. In this illustrated example, the primary inductor power transfer unit 6 is implemented as part of the storage compartment 17 of the vehicle seat 16 of the vehicle cabin structure 8 and the secondary inductor power transfer unit 7 is implemented as part of an accessory such as the cell phone assembly 119, which corresponds to the generic accessory 9, mentioned above.

In this application of the present invention, the storage compartment 17 is constructed with a first wall 17a (e.g., the seat back) that is located directly adjacent the primary inductor power transfer unit 6, which is disposed in the vehicle seat 16 of the vehicle cabin structure 8 in a similar manner as in the center console 10. In other words, the primary inductor power transfer unit 6 is disposed in the vehicle seat 16 of the vehicle cabin structure 8 such that induction current produced by the primary inductor power transfer unit 6 emits through the exposed power transfer surface formed by the first wall 17a of the storage compartment 17 to create an induction field within the storage compartment 17. In this application, the primary inductor power transfer unit 6 is operated in the same manner as in the center console, the vehicle door bin, the overhead vehicle console and the vehicle glove box applications as described above. The storage compartment 17 has a second wall 17b that is spaced apart from, and opposite, the first wall 17a to form an insertion aperture, as seen in FIG. 11. The first and second walls 17a and 17b have first and second compartment surfaces, respectively. The second compartment surface of the second wall 17b constitutes a movement prevention structure in that it prevents perpendicular movement of the secondary inductor power transfer unit 7 of the accessory 9 with respect to the exposed power transfer surface. As a result, the secondary inductor power transfer unit 7 remains within the induction field of the exposed power transfer surface.

As used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle cabin power transfer arrangement comprising:
   a vehicle cabin structure having an accessory receiving recess at least partially defined by a power transfer surface that is accessible from a vehicle cabin and a side wall that at least partially forms an insertion aperture;
   a primary inductor power transfer unit disposed in the vehicle cabin structure such that induction current produced by the primary inductor power transfer unit emits through the power transfer surface to create an induction field proximate to the power transfer surface and within the accessory receiving recess;
   an accessory including a mating portion with a secondary inductor power transfer unit disposed in the mating portion, the mating portion being releasably received within the accessory receiving recess of the vehicle cabin structure such that the secondary inductor power transfer unit is located within the induction field when in a charging position;
   a movement prevention structure positioned on the side wall for engaging the accessory to prevent perpendicular movement of the secondary inductor power transfer unit with respect to the power transfer surface such that the secondary inductor power transfer unit remains within the induction field; and
   a vehicle power source electrically coupled to the primary inductor power transfer unit.

2. The vehicle cabin power transfer arrangement according to claim 1, wherein
   the secondary inductor power transfer unit includes a rechargeable power cell.

3. The vehicle cabin power transfer arrangement according to claim 2, wherein
   the primary inductor power transfer unit includes a switch arranged to selectively electrically couple the vehicle power source to the rechargeable power cell.

4. The vehicle cabin power transfer arrangement according to claim 3, wherein
   the primary inductor power transfer unit includes an indicating element to indicate whether the vehicle power source is electrically coupled to the rechargeable power cell.

5. The vehicle cabin power transfer arrangement according to claim 4, wherein
   the indicating element includes an LED.

6. The vehicle cabin power transfer arrangement according to claim 1, wherein
   the power source includes a vehicle battery.

7. The vehicle cabin power transfer arrangement according to claim 1, further comprising
   an ignition power source switch selectively electrically coupled between the vehicle power source and the primary inductor power transfer unit.

8. The vehicle cabin power transfer arrangement according to claim 1, wherein
   the side wall includes a compartment surface that is spaced apart from and disposed opposite the power transfer surface to prevent perpendicular movement of the secondary inductor power transfer unit away from the induction field.

9. The vehicle cabin power transfer arrangement according to claim 1, wherein
   the movement prevention structure includes a projection extending from the side wall that engages a recess formed on an outer surface of the accessory.

10. A vehicle cabin power transfer arrangement comprising:
    a vehicle cabin structure having a cup receiving recess at least partially defined by a power transfer surface accessible from a vehicle cabin and a side wall that extends from the power transfer surface to form an insertion aperture;
    a primary inductor power transfer unit disposed in the vehicle cabin structure such that induction current produced by the primary inductor power transfer unit emits through the power transfer surface to create an induction field proximate to the power transfer surface and within the cup receiving recess;

a cup including a secondary inductor power transfer unit and a mating portion that is releasably received within the cup receiving recess of the vehicle cabin structure;

a movement prevention mechanism positioned on the side wall for engaging the cup to prevent perpendicular movement of the secondary inductor power transfer unit with respect to the power transfer surface such that the secondary inductor power transfer unit remains within the induction field; and a vehicle power source electrically coupled to the primary inductor power transfer unit.

11. The vehicle cabin power transfer arrangement according to claim 10, wherein the cup includes a heater operatively coupled to the secondary inductor power transfer unit.

12. The vehicle cabin power transfer arrangement according to claim 10, wherein the secondary inductor power transfer unit includes a rechargeable power cell.

13. A vehicle cabin power transfer arrangement comprising:

a vehicle cabin structure having a storage compartment that is at least partially defined by an accessory receiving recess having a first compartment surface including an exposed power transfer surface disposed parallel to an insertion direction, and a second compartment surface spaced apart from and disposed opposite the first compartment surface to form an insertion aperture;

a primary inductor power transfer unit disposed in the vehicle cabin structure such that induction current produced by the primary inductor power transfer unit emits through the exposed power transfer surface to create an induction field proximate to the exposed power transfer surface;

an accessory including an inductor portion having a secondary inductor power transfer unit, with at least the inductor portion of the accessory being configured to be releasably received within the accessory receiving recess along the insertion direction, the second compartment surface preventing perpendicular movement of the secondary inductor power transfer unit with respect to the exposed power transfer surface such that the secondary inductor power transfer unit is located within the induction field; and a vehicle power source electrically coupled to the primary inductor power transfer unit.

14. The vehicle cabin power transfer arrangement according to claim 13, wherein the storage compartment is a vehicle door bin.

15. The vehicle cabin power transfer arrangement according to claim 13, wherein the accessory includes an adapter configured to be attached to an electrical device.

16. The vehicle cabin power transfer arrangement according to claim 13, wherein the storage compartment is part of a center console.

17. The vehicle cabin power transfer arrangement according to claim 13, wherein the storage compartment is part of at least partially defined by an overhead vehicle console.

18. The vehicle cabin power transfer arrangement according to claim 13, wherein the storage compartment is a vehicle glove box.

19. The vehicle cabin power transfer arrangement according to claim 13, wherein the storage compartment is a vehicle seat compartment.

20. The vehicle cabin power transfer arrangement according to claim 13, wherein the secondary inductor power transfer unit includes a rechargeable power cell.

* * * * *